3,390,209
SULFUR CONTAINING DIPHENYLENE
DIPHOSPHATES
James Byron Lovell, Pennington, N.J., and Ronald William Baer, Flushing, N.Y., assignors to American Cyanamid Company, Stamford, Conn., a corporation of Maine
No Drawing. Continuation-in-part of application Ser. No. 287,190, June 12, 1963. This application Jan. 10, 1964, Ser. No. 336,878
4 Claims. (Cl. 260—929)

ABSTRACT OF THE DISCLOSURE

This invention relates to a new class of sulfur containing diphenylene organophosphates, their method of preparation, and insecticidal compositions containing said organophosphates.

---

This application is a continuation-in-part of application, Ser. No. 287,190, filed June 12, 1963, now abandoned.

This invention relates to a new class of sulfur containing diphenylene organophosphates, a method for the preparation thereof, insecticidal compositions containing said compounds, and the use of said compounds as insecticides.

In particular, this invention relates to a new class of sulfur containing diphenylene organophosphate esters having the formula:

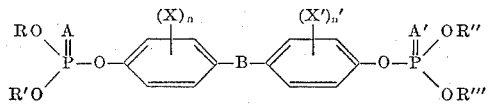

wherein A and A' are sulfur or oxygen and may be the same or different; B is S, SO or $SO_2$; X and X' are halogen such as chlorine or bromine or lower alkyl, i.e., methyl, ethyl, propyl, isopropyl or butyl, and may be the same or different; $n$ and $n'$ are from 0 to 2 and may be the same or different; and R, R', R'' and R''' are lower alkyl and may be the same or different.

Compounds of the type described above may be prepared by reacting a diphenol of the formula:

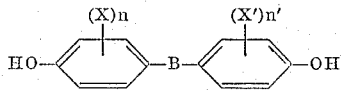

in which B, X and $n$ are the same as described above, with an O,O-dialkyl phosphoryl halide selected from those of the formula

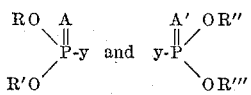

and mixtures thereof, where R, R', R'' and R''' are lower alkyl and may be the same or different, and A and A' are sulfur or oxygen and may be the same or different, and $y$ is halogen.

The reaction is carried out on a relative mole basis of one mole of the diphenol to 2 moles of the phosphoryl halide, although an excess of the latter is sometimes employed to advantage. The reaction is conveniently carried out under alkaline conditions in the presence of a polar solvent such as water, methyl ethyl ketone or the like at temperatures of between about 0 and 100° C. The compounds of this invention may also be prepared in solvents having a wide range of polarity employing a variety of methods to prevents the accumulation of hydrogen halide by-product.

In preparing the diphenylene organophosphates of this invention, we have discovered that solvent systems do exert a substantial influence on the yield and "as is" purity of the product. In this connection, we have determined that employing an aqueous alkaline reaction medium (in lieu of an organic solvent medium such as methyl ethyl ketone) having an pH of greater than 9 and (normally of from about 9.5 to about 12 and a temperature of from 20° C. to about 80° C. normally from 25° C. to 60° C.) results in at least a 70% yield, though usually the yield is higher. As important as yield, however, is that the product has a high "as is" purity. This is most important because the compounds, being of high molecular weight and generally liquid character, cannot be conveniently purified. Further, of course, the use of water as the solvent eliminates the added cost of manufacture which results when use and recovery of organic solvents is necessary.

While the compounds of this invention are adapted for various uses, including use as petroleum additives, they have demonstrated important utility as a general insecticide and particularly outstanding utility against insect larvae and other chewing insects, whether they be in the larvae or adult stage.

As insecticides, they may be applied as dusts, sprays, emulsions, wettable powders and the like. As sprays, they may be employed in organic solvents such as various ketones, e.g., acetone, cyclohexanone, isophorone and the like. Additionally, as sprays, they may be employed with lower monohydric aliphatic alcohols, ketone alcohols, such as diacetone alcohol, and in various esters and aromatic hydrocarbons. As noted, they may be employed as emulsions in water or other non-solvents to which suitable surfactants, wetting agents or emulsifying agents have been added. They may be applied on solid carriers such as talcs and clays such as kaolin clay or fuller's earth, or on such carriers as chalk, wood flour, silica, charcoal, activated carbon or other inert powders. As a wettable powder, the compounds of this invention may be applied to easily wettable carrier materials such as attaclay, with or without the aid of surfactants, or on less readily wettable carriers in combination with suitable surfactants.

In use, the compounds of this invention may be applied to the insect in insecticidally effective amounts or an amount toxic to said insects, the term applied being intended to include application to their habitat or to organic matter, living or dead, such as plant life, wool, paper or wood, which forms the feed of the insect. As will be seen more fully hereinafter, application of the sulfur-containing diphenylene organophosphate esters of this invention to larvae, as for example mosquito larvae, in their natural breeding grounds or the application to plant life which forms the feed of chewing insects has been demonstrated to be a highly effective way of controlling insects, whether in the larvae or adult stage.

With respect to the control of mosquitoes, extensive programs employing numerous types and kinds of compositions have been initiated to control them, both in the larval and adult stages. Among the most successful methods of control yet discovered is the method of spraying the breeding grounds with materials capable of preventing mosquito larvae from maturing to adulthood. Presently available compositions used for this purpose have not been entirely satisfactory, since many of them are toxic to birds, fish and mammals which inhabit the breeding areas that are treated. Under these circumstances, extreme care must be taken when applying such compositions in order to avoid application of dosages harmful to other inhabitants of the area.

In this connection, compounds of the instant invention are unique, for while they are extremely toxic to mosquito larvae in low concentrations they are substantially non-toxic to fish, birds and mammals at concentrations many thousand times that of the larvicidal dose.

As noted, the compounds of this invention are highly effective insecticides when used against insects which consume vegetation or other organic materials to which such compounds are applied. Such insects are man's greatest competitor for food, damaging and consuming enormous quantities of food annually. Typical of such insects are the following: cabbage worms, army worms, grasshoppers, Mexican bean bettles, Colorado potato beetles, European corn borers and cankerworms. In competing with man, the growing or larval stage is, as a general rule, as destructive as the adult stage. In some groups, such as the Lepidoptera, the larva is the only form that does economic damage. In other species of insects, only the adult stage is accountable for damage produced and in still others both the larval and adult stages are responsible. The compounds of this invention have the advantage of being highly effective against both stages of insect life.

The compounds of this invention have the further advantage that they may be combined with other insecticides which kill by contact action. Contact insecticides are effective pjrimarily against insects which suck plant juices without consuming the entire tissue. The combination of two types of insecticides primarily effective against insects having different feeding modes would provide insecticidal compositions effective for the control of all types of insects. Thus, by way of example, the insecticides of this invention may be advantageously combined with O,O-dimethyl S-(1,2-dicarbethoxyethyl)phosphorodithioate, 1 - naphthyl N - methylcarbamate, Pyrethrinmixed esters of pyrethrolone and cinerolone ketoalcohols and two chrysanthemum acids, Allethrin, and O,O-dimethyl S(N - methylcarbamoyl)methyl phosphorodithioate.

In order that the present invention may be more fully understood, the following examples are given primarily by way of illustration. No specific details or enumerations contained therein should be construced as limitations on the present invention, except insofar as they appear in the appended claims. All parts and percentages are by weight unless otherwise specifically designated.

EXAMPLE 1.—O,O,O',O'-TETRAMETHYL O,O'-SULFONYLDI-p-PHENYLENE PHOSPHOROTHIOATE

The above-named compound is prepared by the following reaction in which 75 grams of 4,4'-sulfonyldiphenol was slurried in 300 ml. H$_2$O. A solution of sodium hydroxide, containing 1 equivalent of base in each 100 ml. of solution, is prepared and 200 ml. of this solution is added to dissolve the phenol. Then 144 grams (0.9 mole) of O,O-dimethylphosphorochloridothioate is added to the mixture over a period of 1.5 hours. The sodium hydroxide solution is added slowly to maintain a pH of 10.9–11.0. The mixture is heated to 40° to complete the reaction and to hydrolyze the excess O,O-dimethylphosphorochloridothioate.

The product is filtered and dissolved in 300 ml. benzene which was washed with 100 ml. of 5% sodium hydroxide, 100 ml. of water and 100 ml. of saturated sodium chloride. The organic layer is dried with anhydrous magnesium sulfate and the solvent removed in vacuo. The residue is then crystallized from 200 ml. 2B ethyl alcohol. A total of 111.5 grams is obtained, melting point 66–68°.

EXAMPLE 2.—O,O,O',O'-TETRAETHYL, O,O'-SULFONYLDI-p-PHENYLENE PHOSPHOROTHIOATE

In this example, 10 grams of 4,4'-sulfonyldiphenol is slurried in 50 ml. of water and 20 ml. of 4-molar sodium hydroxide solution is added to dissolve the phenol. Then 22.7 grams of O,O-diethylphosphorochloridothioate is added to the mixture. A pH of 10.5–11.0 is maintained by adding more sodium hydroxide solution as required, maintaining the temperature at 50° C.

The mixture is extracted with chloroform and the extract is washed with 5% sodium hydroxide, 5% hydrochloric acid and saturated sodium chloride. The extract is dried and evaporated in vacuo to give 15.6 grams of the product as an oil.

The pure compound has $n_D^{25} = 1.5524$.

EXAMPLE 3.—O,O,O',O'-TETRAMETHYL O,O'-THIODI-p-PHENYLENE PHOSPHOROTHIOATE

This compound is prepared by reacting 11 grams (0.05 mole) of 4,4'-thiodiphenol and 5.5 grams (0.1 mole) of sodium methoxide slurried in 400 ml. of methyl ethyl ketone and refluxing for 15 minutes, distilling to remove methanol, diluting with 100 ml. of methyl ethyl ketone and adding 16.2 grams (0.11 mole) of O,O-dimethylphosphorchloridothioate dissolved in 50 ml. of methyl ethyl ketone over 5 minutes under reflux. The mixture is then refluxed for 1.5 hours.

The solids are filtered and the solvent removed in vacuo. The residue is dissolved in chloroform and the solution washed with 5% sodium hydroxide, 5% hydrochloric acid, water and saturated sodium chloride solution. The washed solution is then dried and concentrated in vacuo to give 18.3 grams of oil.

Purification by washing with hexane and chromatography on acid-washed alumina gives pure material $n_D^{25} = 1.5860$.

EXAMPLE 4.—TETRAMETHYL SULFONYLDI-p-PHENYLENE PHOSPHATE

The above-named compound results from the addition of 29 grams (0.2 mole) of O,O-dimethylphosphoryl chloride dissolved in 50 ml. of methyl ethyl ketone to a solution of 25 grams of 4,4'-sulfonyldiphenol dissolved in 300 ml. of methyl ethyl ketone with 21.2 grams of sodium carbonate added. The mixture is refluxed for one hour and filtered. The solvent is evaporated in vacuo and chloroform and water are added. The organic layer is washed with 5% sodium hydroxide, saturated sodium chloride, and dried. Concentration in vacuo gives a residue of 26.3 grams of oil which crystallizes when washed with cold ether. Melting point 72–83°. Analytically pure material, melting point 84–6°, is obtained by sublimation at one micron of pressure and 250° C.

EXAMPLE 5.—O,O,O',O'-TETRAETHYL O,O'-THIODI-p-PHENYLENE PHOSPHATE

This compound is prepared by slowly adding 22 grams (0.01 mole) of 4,4'-thiodiphenol to 16.8 (0.20 mole) of potassium ethoxide in 200 ml. of toluene followed by heating to reflux. After cooling, 50 ml. of acetonitrile are added to the slurry followed by 34.4 grams (0.2 mole) of diethylphosphorochloridate. The mixture is refluxed with vigorous stirring for four hours. The solvent is then stripped and the residue dissolved in toluene and filtered. Reprecipitation with petroleum ether gives 39.5 grams of the product as a viscous liquid.

EXAMPLE 6.—O,O,O',O'-TETRAMETHYL O,O'-4,4'-SULFONYLBIS-2 - CHLOROPHENYLENE PHOSPHOROTHIOATE 16 grams (.05 mole) of 4,4'-sulfonylbis(2-chlorophenol) is dissolved in 400 ml. methyl ethyl ketone and 5.4 grams (.1 mole) of sodium methoxide is added. The mixture is heated to reflux for 15 minutes and then 100 ml. of solvent is distilled to remove methanol. 100 ml. of methyl ethyl ketone is then added along with 16.2 grams of dimethylphosphorochloridothioate. The mixture is refluxed at 80° for 4.5 hours. The reaction mixture is stripped of solvent in vacuo and 500 ml. of chloroform and 300 ml. of water are added. The layers are separated and the organic layer treated with 200 ml. of 5% potassium hydroxide. At this point, the system separates into three layers. The aqueous potassium hydroxide was on top; the middle one is an unidentified phosphorous containing compound and the bottom layer is the product containing chloroform solution. The chloroform solution is washed with 100 ml. of 5% potassium hydroxide, 100 ml., 5% hydrochloric acid and 100 ml. of a saturated sodium chloride solution. The solvent is stripped leaving a residue of 14.2 grams of brown oil. This oil is stirred vigorously with hexane. The residual solid weighing 9.2 grams is removed by filtration. This solid is recrystallized twice from isopropanol to give 5 grams of solid (yield 17.5%) melting at 86.0–87.0°.

EXAMPLE 7.—O,O,O',O'-TETRAMETHYL O,O'-4,4'-THIOBIS-3-CHLOROPHENYLENE PHOSPHATE

To 28.7 grams (0.1 mole) of 4,4'-thiobis(3-chlorophenol) in 500 ml. of methyl ethyl ketone is added 11 grams (0.2 mole) of sodium methoxide, followed by distillation to remove methanol. To this is added 29 grams of dimethylphosphorochloridate. The mixture is refluxed for 3 hours with vigorous agitation. The solids are removed by filtration, washed with methyl ethyl ketone, and the combined filtrates evaporated in vacuo. The residue is dissolved in chloroform and washed with saturated sodium carbonate and with water. The washed solution is then dried and evaporated to give 26 grams of the desired product.

EXAMPLE 8.—O,O,O',O'-TETRAMETHYL O,O'-4,4'-SULFONYLBIS - 2 - CHLOROPHENYLENEPHOSPHATE 16 grams (.05 mole) of 4,4'-sulfonylbis-(2-chlorophenol) and 5.4 grams (.1 mole) of sodium methoxide are refluxed in 250 ml. of methyl ethyl ketone for 20 minutes and then 100 ml. of solvent is distilled to remove methanol. 14.5 grams (.1 mole) of dimethylphosphorochloridate is added at a temperature of 66°. An exotherm is observed. The mixture is refluxed for three hours. The solvent is stripped and 200 ml. of water and 300 ml. of chloroform are added. The chloroform layer is removed and washed 3 times with 100 ml. of 10% potassium hydroxide, 100 ml. of 5% hydrogen chloride, 100 ml. of water and 100 ml. of a saturated sodium chloride solution. The chloroform solution is dried with magnesium sulfate and evaporated. 19.5 grams of a brown oil that solidifies on standing is obtained. The solid is crystallized from a boiling solution of 150 ml. of hexane and 160 ml. of benzene. 9.0 grams of tan solid is obtained melting at 108–109° C. A second crop of 3.1 grams is obtained by cooling to 0°, melting point 104–107° C. This was recrystallized from benzene/hexane to give 2.1 grams, melting point 107–108.5° C., total yield 11.1 grams.

EXAMPLE 9.—O,O,O',O'-TETRAETHYL - 4,4' - SULFONYLBIS - 2,6 - DICHLOROPHENYLENE PHOSPHORODITHIOATE 2,2',6,6'-tetrachloro-4,4'-sulfonylbisphenol (9.1 g.) is dissolved in 30 ml. of H$_2$O containing 2.63 grams of KOH. The water is evaporated and the resulting solid is slurried in 200 ml. of methyl isobutyl ketone. To this is added 8.85 grams of O,O-diethyl phosphorochloridothioate and the mixture refluxed for 11 hours. The solvent is evaporated and the residue taken up in chloroform, filtered, and washed with 5% KOH, 5% HCl, and saturated NaCl. Drying and stripping gave a solid which is recrystallized (M.P. 84–87° C.) from hexane.

EXAMPLE 10.—O,O,O',O' - TETRAMETHYL O,O'-SULFINYLDI-p-PHENYLENE PHOSPHOROTHIOATE

To 16.4 grams of 4,4'-sulfinyldiphenol slurried in 100 ml. of water is added sufficient 25% sodium hydroxide to produce strong alkalinity (pH about 11) in the reaction mixture. Then O,O-dimethylphosphorochloridothioate is added in excess and the alkaline pH maintained by the addition of sodium hydroxide at 30° C. intermittently over an 18 hours period. The crude liquid product is separated, washed extensively, dried, and chromatographed on alumina. The product, isolated in low yield, is a liquid, $n_D^{25} = 1.5862$.

EXAMPLE 11.—O,O,O',O'-TETRAMETHYL O,O'-4,4'-SULFONYLBIS-2-METHYL PHENYLENE PHOSPHOROTHIOATE 11.1 grams of 4,4'-sulfonylbis-2-methylphenol dissolved in 150 ml. of hot t-butyl alcohol is added to 9 grams of potassium t-butoxide in 100 ml. of t-butyl alcohol. To this mixture is gradually added 12.8 grams of O,O-dimethylphosphorochloridothioate. The mixture is then heated to reflux. After removing the solvent in vacuo, the residue is washed with 10% potassium hydroxide and saturated sodium chloride. Treating the dried, washed residue with hexane yields the product as a solid which after recrystallization from ethanol melts at 96–97° C.

EXAMPLE 12.—4 - (p-HYDROXYPHENYLSULFONYL) - o-METHYLPHENOL-O,O'-BIS(O,O-DIMETHYLPHOSPHOROTHIOATE)

To 15.4 grams (0.05 mole) of disodium 4-(p-hydroxyphenylsulfonyl)-o-methylphenolate dissolved in 100 ml. of water is added 17.6 grams (0.11 mole) of O,O-dimethylphosphorochloridothioate. The solution is maintained at 60° C. for three hours with vigorous stirring and occasional addition of aqueous sodium hydroxide to maintain alkalinity. The mixture is extracted with chloroform and the organic layer washed with 5% sodium hydroxide and water. The extract is then evaporated in vacuo to give 30.3 grams of the desired product as an amber liquid.

EXAMPLE 13.—O,O,O',O'-DIISOPROPYL O,O' - 4,4'-SULFONYLDI - m-TOLYLENE PHOSPHOROTHIOATE

To 5.5 grams (0.2 mole) of 4,4'-sulfonylbis-3-methylphenol is added 320 ml. of 5% sodium hydroxide and 8.8 grams (0.04 mole) of O,O-diisopropylphosphorochloridothioate. The reaction mixture is heated to 70° C. with stirring for two hours, and then allowed to stir at room temperature for sixteen hours. The organic layer is separated, diluted with methylene chloride, washed with 5% sodium hydroxide, and then with water until neutral. The organic layer is dried and stripped; first, in conventional equipment to remove chloroform, and secondly, in a high vacuum apparatus to remove unreacted O,O-diisopropylphosphorochloridothiate. The resulting product, weighing 3.8 grams, is a nearly immobile oil whose infrared spectrum is in every way consistent with the expected structure.

EXAMPLE 14.—O,O - DIETHYL p - (p - DIMETHOXYPHOSPHINYLOXYPHENYLSULFONYL)PHENYL PHOSPHOROTHIOATE

Twenty-five grams of 4,4'-sulfonyldiphenol is dissolved in water at 50° C. by the addition of 10% sodium hydroxide with stirring to produce a pH of 8.5. To this mixture is added 18.8 grams of O,O-diethylphosphorochloridothioate, and this temperature and pH maintained for 90 minutes. Following this, the mixture is cooled to 35° C., the pH is adjusted to about 10.0, and a quantity of chloroform added equal to half the volume of the reaction mixture. To this well-stirred mixture is added 20 grams of dimethylphosphorochloridate. After one hour the organic layer is removed, washed with saturated sodium carbonate and water, and dried. The solvent is evaporated using an efficient mechanical vacuum pump for the final stages. The resulting product, which weighs 39 grams, has infrared bands indicating both P=O and P=S groups as expected for the desired product.

EXAMPLE 15.—4 - (p-HYDROXYPHENYLSULFON-YL) - o-CHLOROPHENOL-O,O'-BIS(O,O-DIMETH-YLPHOSPHOROTHIOATE

This compound is prepared from 4-(p-hydroxyphenyl-sulfonyl)-o-chlorophenol in essentially the same manner as the compound of Example 1.

EXAMPLE 16.—O,O,O',O' - TETRAMETHYL O, O'-4,4'-SULFONYLDI-(2 - CHLORO - 5 - METHYL-PHENYLENE)PHOSPHOROTHIOATE

This compound is prepared from 4,4'-sulfonyldi(2-chloro-5-methylphenol) by a method similar to that of Example 1 except that a reaction temperature of 50° C. and a 2.5 hour reaction time is employed.

EXAMPLE 17.—O,O,O',O' - TETRAMETHYL O,O'-THIOBIS(2 - CHLORO - p - PHENYLENE)PHOS-PHOROTHIOATE 6.3 grams (.022 mole) of 4,4'-thiobis(2-chloro-phenol) is mixed with 4.95 grams (.044 mole) of potassium t-butoxide in 250 ml. of tBuOH. The mixture is heated to reflux and 7.75 grams (.048 mole) of

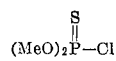

is added. Reflux is continued for one hour and then the solvent is removed under reduced pressure. The residue is partitioned in ether-water and the ether layer washed with dilute base and dried. The residual oily material is washed twice with hexane leaving 8.4 grams (71% yield) of yellow oil. This is purified by treatment of a benzene solution with acid washed alumina; 7 grams (60%) of material is obtained; $n_D^{25}$=1.5954.

Calculated for $P_2S_3O_6Cl_2C_{16}H_{18}$. MW, 537.4. Theory: C, 35.89; H, 3.39; S, 17.97; Cl, 13.25; P, 11.57. Found: C, 36.20; H, 3.73; S, 17.68; Cl, 13.25; P, 11.75.

EXAMPLE 18.—O,O,O',O' - TETRAETHYL O,O'-THIODI-p-PHENYLENE PHOSPHOROTHIOATE

This compound is prepared following the procedure of Example 17, reacting 0.1 mole of O,O-diethylphosphoro-chloridothioate, 0.05 mole of 4,4' - thiodiphenol and 0.1 mole of potassium tert.-butoxide in a total of 100 ml. of tert.-butanol. The reflux period is 5 minutes. Chromatographic purification yields 82% of theory of analytically pure material as a viscous, colorless liquid with $n_D^{25}$=1.5610.

EXAMPLE 19.—O,O,O',O' - TETRAMETHYL O,O'-SULFINYLBIS(2 - CHLORO - p - PHENYLENE) PHOSPHOROTHIOATE

The reaction and work-up were the same as for Example 17. Chromatography on deactivated alumina gave 4.3 grams (15.6%); $n_D^{25}$=1.5986.

Calculated for $P_2S_3O_7Cl_2C_{16}H_{18}$. MW, 551.4. Theory: C, 34.85; H, 3.29; P, 11.24; S, 17.45; Cl, 12.86. Found: C, 35.04; H, 3.17; P, 11.09; S, 17.50; Cl, 12.70.

EXAMPLE 20.—TETRAMETHYL THIODI-p-PHEN-YLENE PHOSPHATE 8.75 grams (.04 mole) of 4,4'-thiodiphenol was dissolved in 150 ml. of t-butanol along with 12.8 grams (.088 mole) of (MeO₂P(O) Cl. 9.9 grams (.088 mole) of potassium t-butoxide in 100 ml. of t-butanol was added. The mixture was heated to reflux for 10 minutes and the solvent stripped. The residue was taken up in ether and washed with water, dilute acid and dilute base. Drying and removal of the solvent gave 5.8 grams, 33.3% yield, with an index $n_D^{25}$=1.5425.

Analysis.—Theory: C, 44.24; H, 4.64; S, 7.38; P, 14.26. Found: C, 43.91; H, 4.68; S, 7.37; P, 14.18.

In addition to the above compounds, the following illustrative compounds are contemplated by this invention.

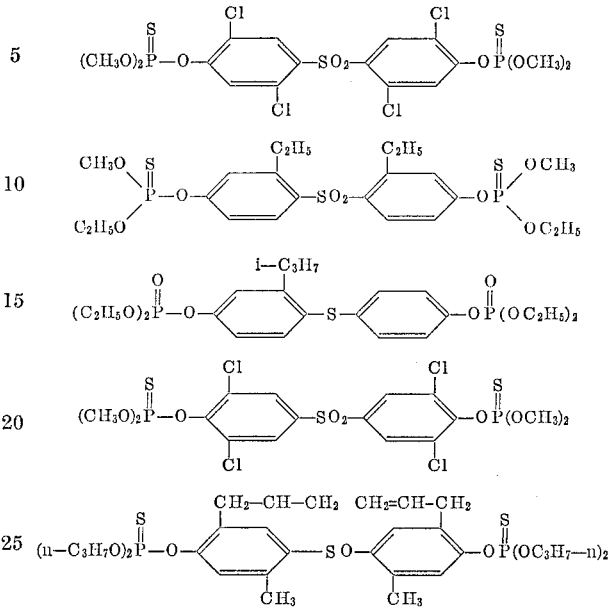

EXAMPLE 21

To demonstrate the effectiveness of compounds of the present invention as general insecticides, the following tests were run against mosquito larvae, Mexican bean beetle larvae, cotton boll weevil, southern armyworm, aphids, 2-spotted spider mites, confused flour beetle, large milkweed bug and the black carpet beetle larvae. The test procedures used are given below and the results obtained with various compounds in terms of the percent kill obtained with the identified compounds at various concentrations are reported hereinafter.

TESTING PROCEDURE AGAINST VARIOUS INSECTS

Mosquito larvae (Anopheles quadrimaculatus)

Groups of 25 larvae are transferred by a medicine dropper to 50 ml. beakers containing 25 ml. of water. To 400 ml. glass beakers, 225 ml. of water are added. Concentrations of the test compound are prepared by placing 100 mg. of the compound in 100 ml. of acetone (Solution A). 2.5 ml. of Solution A per 100 ml. of acetone is equal to 25 p.p.m. (Solution B). 1.0 ml. of Solution B is pipetted under the surface of the 225 ml. of water and stirred vigorously. The mosquito larvae are added by tipping the contents of the 50 ml. beaker into the 225 ml. Final concentration is 0.1 p.p.m. The beakers are held at 80° F., and after 24 hours mortality counts are made. If compounds produce 75% or more mortality, serial dilutions are made until the activity is nil.

Mexican bean beetle (Epilachna varivestis)

Compounds to be tested are made up as 0.1% solutions in 65% acetone-35% water. Sieva lima bean leaves are dipped in the test solution and set in the hood to dry. When dry, they are placed in four-inch, petri dishes which have a moist filter paper in the bottom and ten, third-instar, bean beetle larvae are added to each dish. The dishes are covered and held at 80° F., 60% relative humidity. After three days, mortality counts and estimates of the amount of feeding are made. Compounds producing kills greater than 75% are further tested at ten-fold dilutions in 65% acetone-35% water.

Boll weevil (Anthonomus grandis)

Compounds to be tested are made as 0.1% solutions. Cotton plant leaves are dipped in the test solution and set in the hood to dry. When dry, they are placed in four-inch, petri dishes which have a moist filter paper in the bottom, and ten, adult, boll weevils are added to each dish. The dishes are covered and held at 80° F., 60% relative humidity. After three days, mortality counts and estimates of the amount of feeding are made. Compounds producing kills greater than 50% are further tested at tenfold dilutions in 65% acetone-35% water.

Southern Armyworm (*Prodenia eridania*)

Compounds to be tested are made up as 0.1% solutions. Sieva lima bean leaves are dipped in the test solution and set in the hood to dry. When dry, they are placed in four-inch, petri dishes which have a moist filter paper in the bottom, and ten, third-instar, armyworm larvae about ⅜″ long are added to each dish. The dishes are covered and held at 80° F., 60% relative humidity. After two days, mortality counts and estimates of the amount of feeding are made. Compounds producing kills greater than 50% are further tested at ten-fold dilutions in 65% acetone-35% water.

Nasturtium aphids (*Aphis rumicis*)

The compounds to be tested are made up as 0.1% solutions in 65% acetone-35% water. Three-inch pots containing a nasturtium plant, two-inches tall and infested two days before, are selected for testing. The pots are placed on a turntable (4 r.p.m.) and sprayed for two revolutions with a #154 DeVilbiss Atomizer at 20 p.s.i. air pressure. The spray tip is held about six inches from the plants and the spray is directed so as to give complete coverage of the aphids and the plants. The sprayed plants are laid on their side on white-enamel trays which have had the edges coated with #50 S.A.E. oil as a barrier. Mortality estimates are made after holding for two days at 70° F., 50% relative humidity, and compounds producing kills greater than 75% are further tested at ten-fold dilutions in 65% acetone-35% water.

Two-spotted spider mite (*Tetranychus telarius*)

Compounds to be tested are made up as 0.1% solutions in 65% acetone-35% water. Sieva lima bean plants with the first pair of leaves three to four inches in size are infested about five hours before testing, using about 100 adult mites per leaf. The infested leaves are dipped in the test solutions (in four-inch, crystallizing dishes) for three seconds, and the plants set in the hood to dry. The treated plants are held for two days at 80° F., 60% relative humidity, and the adult mite mortality calculated by counting dead and alive adults on one leaf under the 10X binocularscope. The other leaf is held an additional five days and then is examined at 10X power to estimate the kill of eggs and newly hatched nymphs, giving a measure of ovocidal and residual action, respectively. Compounds producing kills greater than 85% are further tested at ten-fold dilutions in 65% acetone-35% water.

Confused flour beetle (*Tribolium Confusum*)

Compounds to be tested are made up as 1.0% dusts by mixing 0.1 gram of compound with 9.9 grams of Pyrax ABB talc, wetting with 5 ml. of acetone and grinding in a mortar and pestle until dry. 125 mg. of this 1% dust is then blown into the top of a dust settling tower with a short blast of air at 20 p.s.i. The dust is allowed to settle on 4-inch, petri dishes for two minutes. The dishes are removed and 25 adult, confused flour beetles are added immediately. The dishes are held for three days at 80° F., 60% relative humidity, following which, mortality counts are made.

Large milkweed bug (*Oncopeltus fasciatus*)

The 1% dusts described above are used in this test. 25 mg. of the 1% dust is sprinkled evenly over the bottom of a 7-inch, crystallizing dish using a screen-bottom, plastic cup about ⅝″ in diameter as an applicator. Twenty adult bugs are added and a screen cover put on the dish. Water is supplied in 2-ounce bottles with a cotton wick. Mortality counts are made after holding for three days at 80° F., 60% relative humidity.

Black carpet beetle larvae (*Attagenus piceus*)

A small piece of wool cloth was dipped for 5 minutes in an acetone solution containing 1.0% of the test compound. The cloth was wrung through a 2-roller wringer and held by a bulldog clip in an exhaust hood to dry for 24 hours. Four wool samples, 3.5 cm. in diameter, were cut from the treated cloth and placed in a 4-inch petri dish containing 10 black carpet beetle larvae of uniform size. Untreated wool samples were included as a check. The test was held at 80° F. and at 60% relative humidity.

The results of these tests are as follows:

Anopheles quardimaculatus larvae.—100% kill with the compound of Examples 1, 2, 3, 6, 10, 18, 19 and 20 (96% kill) at a concentration of .1 part per million and 76%, 98%, 66%, 58% and 58% kill for compounds 1, 3, 6, 17 and 19 at a concentration of .01 part per million.

Mexican bean beetle larvae.—100% kill at a .1% concentration in a solvent carrier consisting of 65% acetone and 35% water and a 100% kill with the compound of Examples 1, 4, 10 and 20 in such a solvent carrier at a concentration of .01%. A 90% kill by the compounds of Examples 17, 18 and 19 at a .1% concentration. A 100%, 90%, 70% and 70% kill by the compounds of Examples 20, 2, 3 and 17, respectively, at a concentration of .01% in a solvent carrier consisting of 65% acetone and 35% water.

Cotton boll weevil.—100% kill with the compound of Examples 1 and 3 at a concentration of .01% in a solvent carrier consisting of 65% acetone and 35% water. 60% and 30% kill, respectively, for the compounds of Examples 2 and 4 at a .01% concentration in 65% acetone-35% water.

Southern armyworm.—100% kill with the compounds of Examples 1, 2, 3, 4, 10 and 17 at a concentration of .01% in a solvent carrier consisting of 65% acetone and 35% water. 100% kill with the compounds of Examples 17, 18, 19 and 20 at a concentration of .1% and a 90% kill with the compound of Example 8 at a concentration of .1% in a solvent carrier consisting of 65% acetone and 35% water.

Nasturtium aphid.—100% kill with the compounds of Examples 3, 4, 10, 17, 19 and 20, 85% kill with the compound of Example 1 at concentrations of .1% in a solvent carrier consisting of 65% acetone and 35% water. A 100% kill at a concentration of .01% with the compound of Examples 3, 4, 10, 17 and 20 in a solvent carrier consisting of 65% acetone and 35% water.

Two-spotted spider mite.—100% kill with the compound of Examples 4 and 20 at a concentration of .1% in a solvent carrier consisting of 65% acetone and 35% water. 86 and 91% kill, respectively, for the compounds of Examples 2 and 3 at a concentration of .1% in a solvent carrier consisting of 65% acetone and 35% water. A 100% kill with the compound of Example 20 at a .01% concentration.

Confused flour beetle.—100% kill with the compounds of Examples 3 and 20 at a concentration of 1% on solid carriers such as fuller's earth or attapulgus clay.

Milkweed bug.—100% kill with the compounds of Examples 4, 10, 17 and 20 at a concentration of 1% on solid carriers such as fuller's earth and attapulgus clay. 78 and 95% kill, respectively, with the compounds of Examples 1 and 3 at a concentration of 1% on solid carriers such as fuller's earth and attapulgus clay.

Black carpet beetle larvae.—100% mortality of the larvae, and no damage to the wool was observed 3 days after infestation employing the compound of Example 1 at a concentration of 1% in acetone and water.

In treating the breeding grounds of mosquitoes, i.e., the swamps, marshes and ponds which generally form the head waters of lakes, reservoirs and rivers, it is essential that the compositions used for treatment be effective against the mosquito or mosquito larvae, as the case may be, and be non-toxic to the higher forms of life such as fish, birds, and the like, as well as being safe and non-toxic to the mammalian population. In this regard, the efficacy of compounds of the present invention in controlling mosquito larvae and the high order of safety with respect to the higher and lower forms of life as represented by mammals, birds, fish and the like, is demonstrated by Example 22.

In tests with mosquito larvae, it has been determined that concentrations as low as 0.008 p.p.m. of the compound of Example 1 will produce substantially complete kill of the larvae. It has also been determined that concentrations as high as 50 p.p.m. or 5000 times the effective larvicidal concentration has low toxicity to fish and 590 p.p.m. or 59,000+ times the larvicidal concentration were required to produce a $LD_{50}$ (lethal dose killing 50% of the mice in a standard test in determining mammalian toxicity) in mice when adminishtered orally.

EXAMPLE 22.—EFFICACY AGAINST MOSQUITO LARVAE IN FISH SAFETY TEST

Ten guppies, approximately two weeks old, were randomly selected from a breeding tank. They were divided into two groups of five each and placed in beakers containing 500 ml. of water. One hundred mg. of O,O,O′,O′-tetramethyl O,O′-sulfonyldi-p-phenylene phosphorothioate was then diluted to 8 ml. with 95% ethanol to produce a 12,500 p.p.m. solution of the compound. Two ml. of this test solution was added to one beaker containing five guppies. To the other beaker containing five guppies, 2 ml. of 95% ethanol containing no additive was added. Both beakers were kept at room temperature during the entire experiment and the guppies in both groups were fed a standard commercial guppy diet. The beakers were examined daily. After twelve days, two guppies in the test solution died and were removed from the beaker. On the fifteenth day after initiation of the tests, 25 mosquito larvae were added to each beaker. The beakers were then examined on an hourly basis. Two hours after introducing the mosquito larvae, all larvae in the treated solution were dead. The mosquito larvae placed in the untreated solution were all alive excepting those eaten by the guppies. Several days after mosquito larvae inoculation, all larvae in the untreated solution were eaten. Thirty days after the tests were begun, the guppies in both beakers were returned to their tank. No further deaths had occurred during the experiment.

We claim:

1. A compound of the formula:

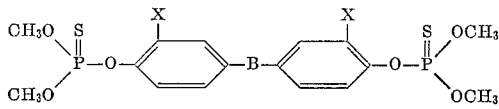

wherein B is selected from the group consisting of S, SO, $SO_2$ and X is chlorine or bromine except that when B is SO or $SO_2$, X can also be hydrogen.

2. O,O,O′,O′ - tetramethyl O,O′ - sulfonyldi-p-phenylene phosphorothioate.

3. O,O,O′,O′ - tetramethyl O,O′ - 4,4′ - sulfonylbis - 2-chlorophenylene phosphorothioate.

4. O,O,O′,O′-tetramethyl O,O′-thiobis(2 - chloro-p-phenylene)phosphorothioate.

References Cited

UNITED STATES PATENTS 2,974,158  3/1961  Lanham _____ 260—973 XR
3,153,663  10/1964  Sirrenberg et al. ____ 260—929

CHARLES B. PARKER, *Primary Examiner.*

A. H. SUTTO, *Assistant Examiner.*

UNITED STATES PATENT OFFICE
CERTIFICATE OF CORRECTION

Patent No. 3,390,209                                June 25, 1968

James Byron Lovell et al.

It is certified that error appears in the above identified patent and that said Letters Patent are hereby corrected as shown below:

Column 4, line 51, "(0.01)" should read -- (0.10) --; same line 51, after "16.8" insert -- grams --. Column 6, line 39, "(0.2 mole)" should read -- (.02 mole) --. Column 10, line 17, after "10," insert -- 17, --.

Signed and sealed this 30th day of December 1969.

(SEAL)
Attest:

Edward M. Fletcher, Jr.                       WILLIAM E. SCHUYLER, JR.

Attesting Officer                                      Commissioner of Patents